United States Patent
Saito et al.

(10) Patent No.: US 7,694,108 B2
(45) Date of Patent: Apr. 6, 2010

(54) RECONFIGURABLE SEMICONDUCTOR DEVICE CAPABLE OF CONTROLLING OUTPUT TIMING OF DATA

(75) Inventors: Miyoshi Saito, Kawasaki (JP); Hisanori Fujisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 11/504,763

(22) Filed: Aug. 16, 2006

(65) Prior Publication Data
US 2007/0234013 A1 Oct. 4, 2007

(30) Foreign Application Priority Data
Mar. 31, 2006 (JP) .............................. 2006-098289

(51) Int. Cl.
*G06F 15/76* (2006.01)
*H04B 1/69* (2006.01)

(52) U.S. Cl. ........................................ 712/36; 375/130

(58) Field of Classification Search ................ 375/130, 375/135, 136; 712/36
See application file for complete search history.

(56) References Cited

U.S. PATENT DOCUMENTS

| | | | |
|---|---|---|---|
| 5,239,556 A * | 8/1993 | Ishigaki et al. ............... 375/147 |
| 5,625,806 A * | 4/1997 | Kromer ....................... 713/501 |
| 5,631,922 A * | 5/1997 | Sekine et al. ................ 375/140 |
| 5,748,630 A * | 5/1998 | Bergantino et al. .......... 370/412 |
| 5,995,571 A * | 11/1999 | Inuzuka ....................... 375/367 |
| 6,292,506 B1 * | 9/2001 | Brendle et al. ............... 375/130 |
| 6,738,411 B1 * | 5/2004 | Ogawa et al. ................ 375/130 |
| 6,842,854 B2 | 1/2005 | Nishihara et al. |
| 7,430,233 B2 * | 9/2008 | Suzuki et al. ................ 375/142 |
| 2001/0034227 A1 * | 10/2001 | Subramanian et al. ...... 455/419 |
| 2001/0040915 A1 * | 11/2001 | Subramanian ............... 375/150 |
| 2001/0048380 A1 * | 12/2001 | Medlock et al. ................ 341/50 |
| 2002/0031166 A1 * | 3/2002 | Subramanian et al. ...... 375/130 |
| 2003/0081546 A1 * | 5/2003 | Agrawal et al. ............. 370/229 |
| 2003/0095531 A1 * | 5/2003 | Soerensen et al. ........... 370/342 |
| 2004/0202039 A1 * | 10/2004 | Takayanagi .................. 365/233 |
| 2005/0083881 A1 * | 4/2005 | Ohwada ...................... 370/331 |

(Continued)

FOREIGN PATENT DOCUMENTS
JP 2004-199694 A 7/2004

OTHER PUBLICATIONS
Zhang Jian-hui Chang Shu-ping, "Application of platform FPGAs in W-CDMA", This paper appears in: ASIC, 2001. Proceedings. 4th International Conference on; Publication Date: 2001; on pp. 490-493.*

(Continued)

*Primary Examiner*—Eddie P Chan
*Assistant Examiner*—Keith Vicary
(74) *Attorney, Agent, or Firm*—Arent Fox LLP

(57) ABSTRACT

An arithmetic unit capable of reconfiguring circuitry in accordance with configuration data supplied includes a data processing unit performing a processing using input data; an output data maintenance unit maintaining the result of the processing to output it as an output data; and an output valid signal control unit outputting an output valid signal indicating whether or not the output data is valid, in which an output timing of a valid data to outside the arithmetic unit can be controlled optionally by controlling the output timing of the output valid signal.

17 Claims, 7 Drawing Sheets

U.S. PATENT DOCUMENTS

2005/0207445 A1* 9/2005 Kihara .................. 370/470
2008/0059551 A1* 3/2008 Van Berkel et al. ......... 708/490
2008/0100365 A1* 5/2008 Kaizuka .................. 327/291
2008/0129361 A1* 6/2008 Mamidwar ............... 327/261

OTHER PUBLICATIONS

Chugh, M. Bhatia, D. Balsara, P.T. ; Design and Implementation of Configurable W-CDMA Rake Receiver Architectures on FPGA; This paper appears in: Parallel and Distributed Processing Symposium, 2005. Proceedings. 19th IEEE International Publication Date: Apr. 4-8, 2005; On pp. 145b-145b.*

C. Traver et al., "Cell Designs for Self-Timed EPGAs," in the proceedings of the $14^{th}$ Annual IEEE International ASIC/SOC Conference (IEEE CAT. No. 01TH8558) IEEE Piscataway, NJ, USA, 2001, pp. 175-179, XP002435932; ISBN: 0-7803-6741-3; 2001.

R. Payne, "Self-Timed FPGA Systems," Field-Programmable Logic and Applications. $5^{th}$ International Workshop, FPL'95. Proceedings Springer-Verlag Berlin, Germany, 1995, pp. 21-35, XP 002435933; ISBN: 3-540-60294-1; 1995.

* cited by examiner

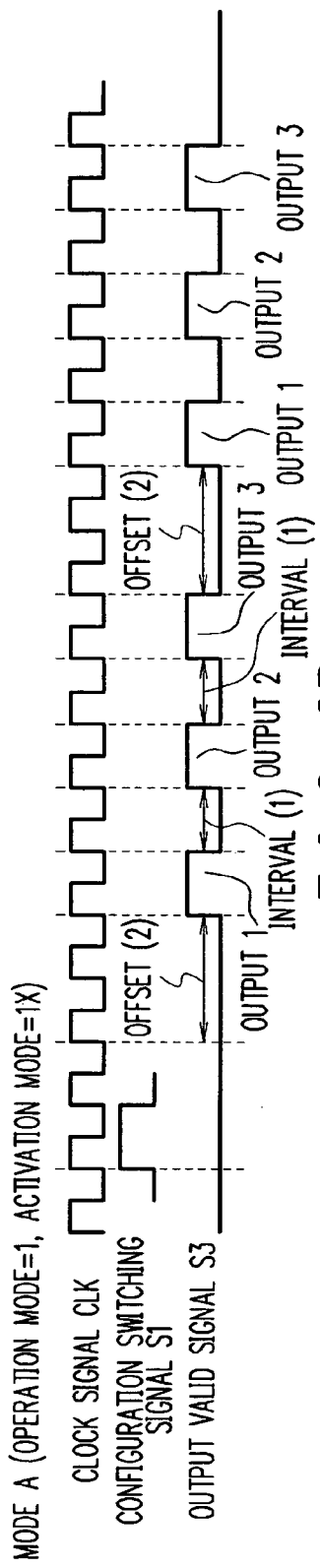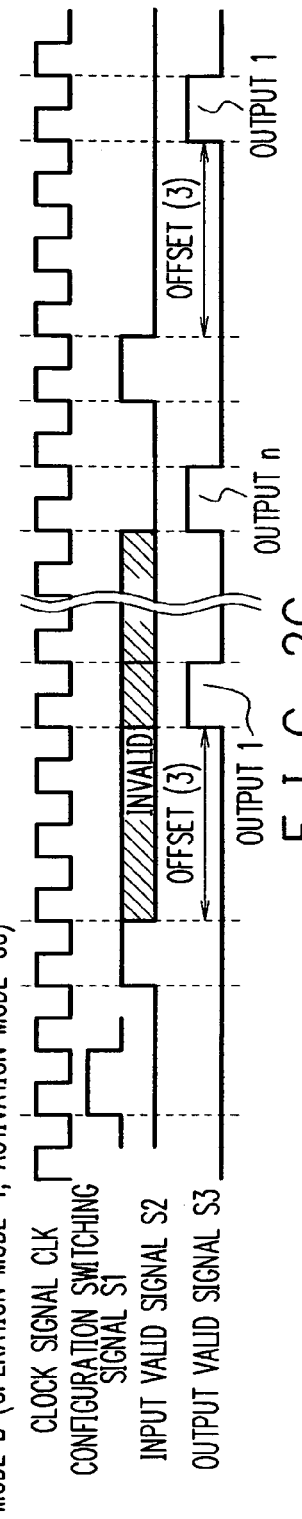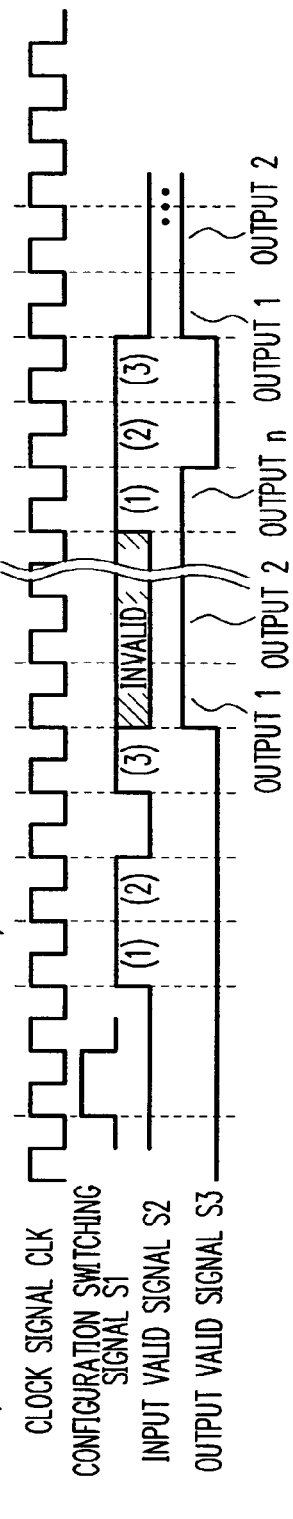

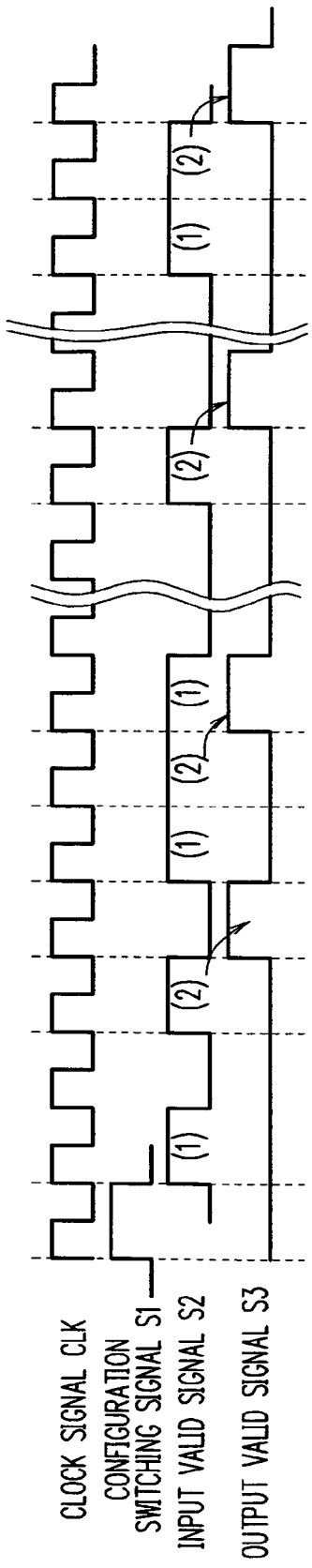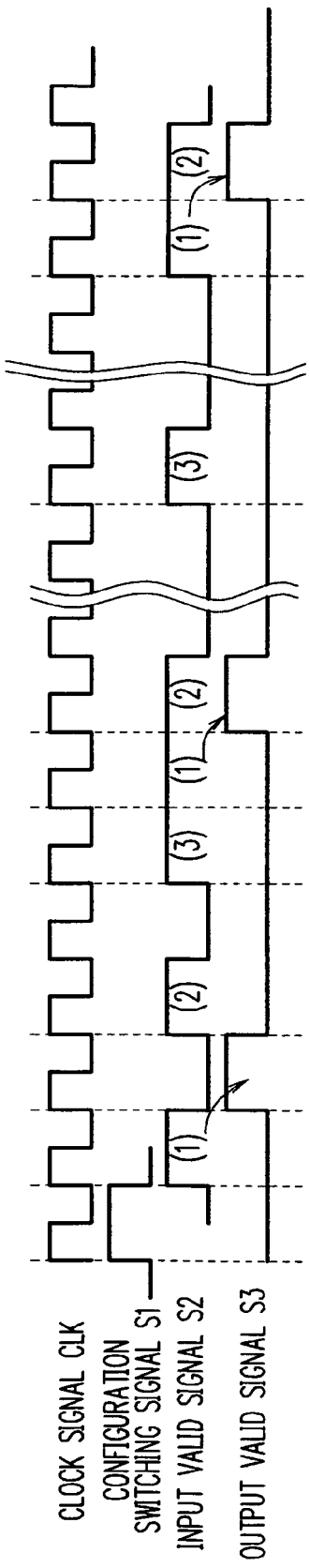

F I G. 4
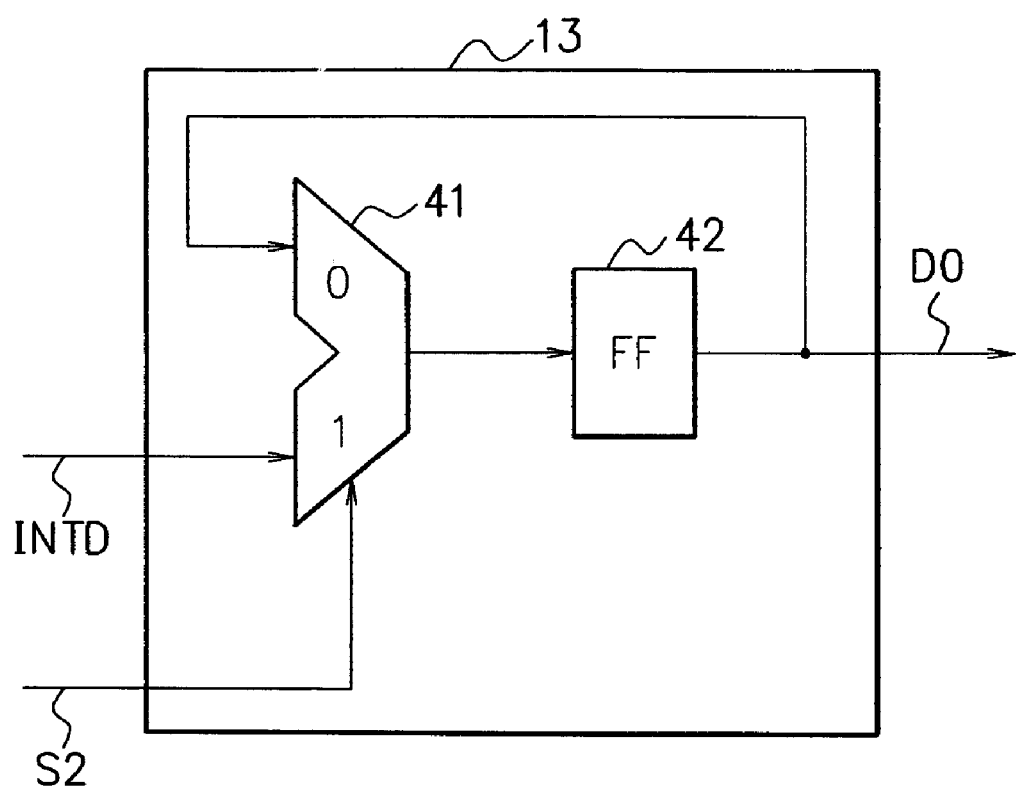

FIG. 6

```
IF (OUTPUT NUMBER COUNTED VALUE == NUMBER OF REPETITION TIMES)
        END OUTPUT SIGNAL DETECTION VALUE = 1
ELSE
        END OUTPUT SIGNAL DETECTION VALUE = 0 ;

IF (OFFSET / INTERVAL COUNTED VALUE ==0)
        FIRST SIGNAL DETECTION VALUE = 1
ELSE
        FIRST SIGNAL DETECTION VALUE = 0 ;

IF (OFFSET / INTERVAL COUNTED VALUE = (INTERVAL FLAG ? INTERVAL VALUE : OFFSET VALUE))
        OFFSET / INTERVAL DETECTION VALUE = 1
ELSE
        OFFSET / INTERVAL DETECTION VALUE = 0
```

FIG. 7

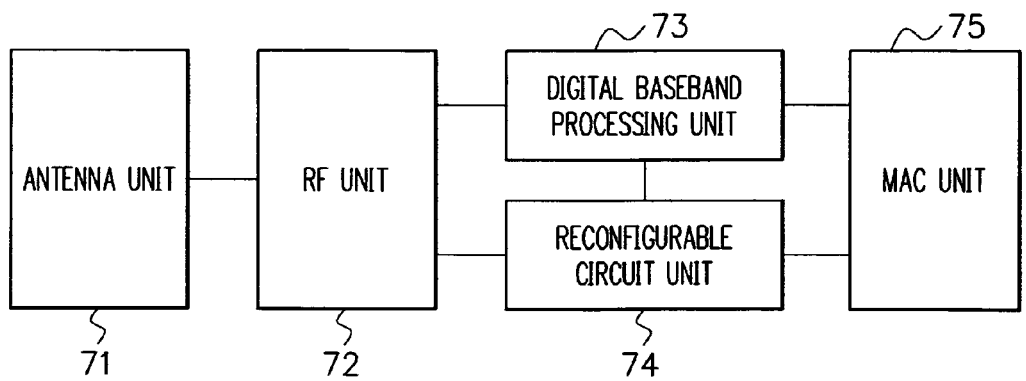

RECONFIGURABLE SEMICONDUCTOR DEVICE CAPABLE OF CONTROLLING OUTPUT TIMING OF DATA

CROSS-REFERENCE TO RELATED APPLICATIONS

This application is based upon and claims the benefit of priority from the prior Japanese Patent Application No. 2006-098289, filed on Mar. 31, 2006, the entire contents of which are incorporated herein by reference.

BACKGROUND OF THE INVENTION

1. Field of the Invention

The present invention relates to a semiconductor device, and more specifically, to a data flow control technology in a reconfigurable semiconductor device.

2. Description of the Related Art

A coarse-grained reconfigurable circuit is composed of a plurality of processing elements provided with various functions and an internal-connection network connecting between such processing elements. In the coarse-grained reconfigurable circuit, the functions of the processing elements and a path of the internal-connection network are set in accordance with configuration data, and any function can be realized by changing the configuration data. The coarse-grained reconfigurable circuit is designed such that processing details executed by the processing elements and the path of the data provided to the processing are dynamically reconfigurable in accordance with the configuration data.

The processing element is provided with functions such as computing functions by word unit including four-arithmetic operations and shift and mask operations, a delay processing for adjusting timing, a conditional statement processing like a selector, and a bit processing including logical AND/OR operations. Further, with the above-described functions and so on, the processing element can function as a counter.

The processing performed by stream-oriented applications such as wireless communication and so forth (the processing related to communication stream data) includes a processing with a data flow control processing. Such a processing with the flow control includes a processing that executes a pipeline processing by converting a single input data into sequential series data and also a processing that, on the other hand, retrieves only a single valid data from sequential series data for computation. As an example of the former processing, there is a processing of spreading code (refer to FIG. 8A) in which a 1-bit input (code) is multiplied by a multiple-bits spread code to be converted into a multiple-bits signal. As an example of the later processing, there is a data transfer processing (refer to FIG. 9A and FIG. 9B) between circuits operating at different frequencies, for example, a data transfer processing from a circuit operating at a lower frequency to a circuit operating at a higher frequency.

In order to realize the processing as described above, in the case of a normal circuit of which circuitry is fixed, what should be done is only to install a circuit simply executing the processing in advance. Meanwhile, in the case of the reconfigurable circuit, a processing form like that of a so-called data flow machine is preferable. Hence, in order to realize a processing as described above using a basic function provided in the processing element, many processing elements are required.

For instance, in order to realize a processing of spreading code that uses the multiple-bits (for example, n-bits) spread code as shown in FIG. 8A, a 1-bit input (code) is further repeated (n−1) times for the purpose of repeating the same input (code) in terms of time. By multiplying the input with the n-bits spread code, an n-bits signal after the code-spreading processing is obtained.

Specifically, as shown in FIG. 8B, an input signal is converted into parallel signals by being branched, and after that a selector 103 sequentially selects a signal in accordance with an output from a counter 102 to carry out a parallel-serial conversion process, so that a sequential one-dimensional series signal is obtained. By multiplying the one-dimensional series signal with the spread code thereafter using a logical exclusive OR operator (XOR operator) 104, a desired code after the spread processing can be obtained. Here, in the previous step of the parallel-serial conversion by the selector 103, timing adjustments are performed by delay devices 101-1, 101-2, ..., 101-(n−1) so that outputs thereof are arranged sequentially.

Each of the delay device 101, counter 102, selector 103 and XOR operator 104 is composed of a single processing unit. Accordingly, in order to realize the processing of spreading code using, for example, an n-bits spread code by the reconfigurable circuit, (n−1) piece(s) of delay device(s) 101 capable of delaying by "n" at maximum, the counter 102, the n-inputs selector 103, the XOR operator 104 are used, requiring many processing elements.

[Patent Document 1] Japanese Patent Application Laid-open No. 2004-199694

SUMMARY OF THE INVENTION

An object of the present invention is to provide a reconfigurable semiconductor device including arithmetic units capable of controlling output timing of data.

The semiconductor device according to the present invention includes a plurality of arithmetic units capable of dynamically reconfiguring circuitry in accordance with configuration information supplied by a configuration memory, in which the arithmetic unit has a data processing unit, an output data maintenance unit, and an output valid signal control unit. A processing result, which is obtained by the data processing unit performing a processing in accordance with the configuration information using an input data, is maintained by the output data maintenance unit. The maintained processing result is outputted by the output data maintenance unit as an output data, and, at the same time, the output valid signal control unit outputs an output valid signal indicating whether or not the output data is valid.

According to the present invention, the processing result obtained by the processing of the input data is maintained and outputted as an output data, and the output valid signal indicating whether or not the output data is valid is outputted, so that the output timing of the output data can be controlled optionally by controlling the output timing of the output valid signal.

BRIEF DESCRIPTION OF THE DRAWINGS

FIG. 2A, FIG. 2B, FIG. 2C, FIG. 3A and FIG. 3B are timing charts showing output timings of data from an arithmetic unit according to the present embodiment;

FIG. 4 is a view showing a configuration example of an output data maintenance unit;

FIG. 6 is a view to illustrate a function of a comparison unit in the output valid signal control unit;

FIG. 7 is a view showing a configuration example of a radio communication system using the reconfigurable circuit according to the present embodiment;

DETAILED DESCRIPTION OF THE PREFERRED EMBODIMENTS

Hereinafter, an embodiment according to the present invention will be described with reference to the drawings.

Figure 1:
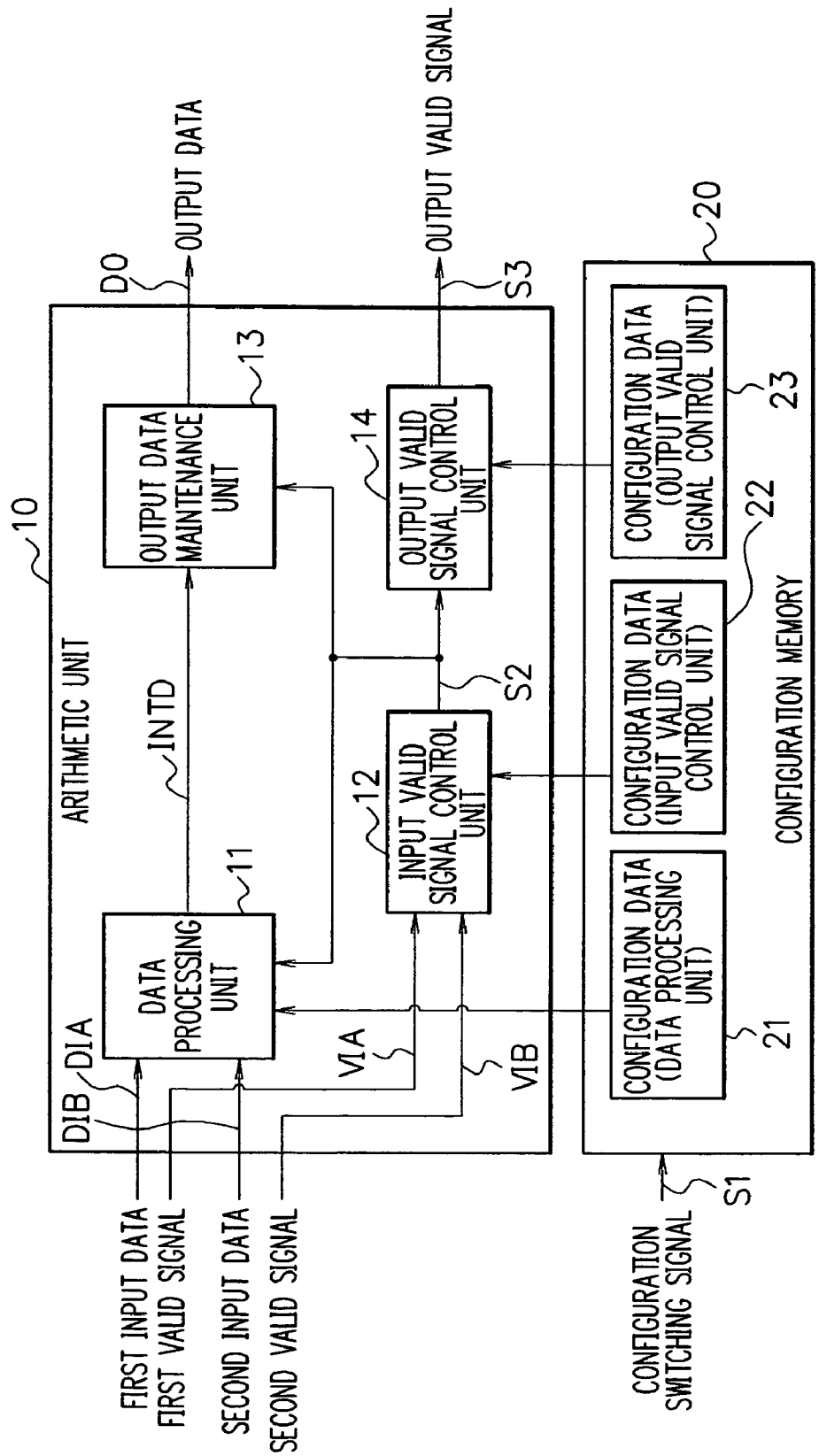
FIG. 1 is a block diagram showing a configuration example of a reconfigurable circuit according to an embodiment of the present invention.

FIG. 1 is a block diagram showing a configuration example of a reconfigurable circuit applying a semiconductor device according to an embodiment of the present invention. Note that FIG. 1 shows only one arithmetic unit (processing element) 10, however, the reconfigurable circuit according to the present embodiment is composed of a plurality of arithmetic units (processing units) as shown in FIG. 1. Further, configuration data as configuration information is supplied to each of the arithmetic units. A configuration memory 20 is connected to the plural arithmetic units provided in the reconfigurable circuit in a manner that the configuration data can be supplied to them.

In the reconfigurable circuit according to the present embodiment, a processing (function) executed by each of the arithmetic units 10 and a data input/output path between the arithmetic units and so forth are set in accordance with the configuration data from the configuration memory 20. With this, the reconfigurable circuit according to the present embodiment can realize any function by allowing its circuitry to be dynamically reconfigured based on the configuration data.

Here, for the arithmetic unit 10 in the reconfigurable circuit according to the present embodiment, as data output timings to be specified in the configuration data, as shown in FIGS. 2A to 2C and FIGS. 3A and 3B, five patterns (mode A, mode B, mode C, mode D and mode E) are provided as will be described below. The respective arithmetic units 10 selectively realize the five patterns shown in FIGS. 2A to 2C and FIGS. 3A and 3B in accordance the configuration data respectively supplied. Note that the respective modes of the data output timing will be described in detail hereinafter.

<Mode A> (Refer to FIG. 2A)

A first output signal (output data with an output valid signal indicating validity of the data) is outputted after an offset time has passed after switching the configuration (more specifically, when the arithmetic unit 10 starts an operation in accordance with the configuration data after a switching after a predetermined time has passed). Subsequently, the output valid signal is made invalid during an interval time, and the next output signal (output data with the output valid signal) is outputted after the interval time has passed. This processing, in which the output signal is outputted at an interval of the interval time, is repeated specified repetition times.

<Mode B> (Refer to FIG. 2B)

The first output signal (output data with the output valid signal) is outputted after the offset time has passed after the valid signal (with the input valid signal) is inputted. Subsequently, the output valid signal is made invalid during the interval time, and the next output signal (output data with the output valid signal) is outputted after the interval time has passed. The processing, in which the output signal is outputted at an interval of the interval time, is repeated specified repetition times.

<Mode C> (Refer to FIG. 2C)

The first output signal (output data with the output valid signal) is outputted after specified numbers of valid signals (with the input valid signals) are inputted. Subsequently, the output valid signal is made invalid during the interval time, and the next output signal (output data with the output valid signal) is outputted after the interval time has passed. The processing, in which the output signal is outputted at an interval of the interval time, is repeated specified repetition times.

<Mode D> (Refer to FIG. 3A)

After the specified numbers of valid signals (with the input valid signals) are inputted, the output signal (output data with the output valid signal) is outputted only once.

<Mode E> (Refer to FIG. 3B)

The output signal (output data with the output valid signal) is outputted only once after the valid signal (with the input valid signal) is inputted, and no output is made thereafter until the specified numbers of valid signals (with the input valid signals) are inputted. In other words, the output signal is outputted only once after the valid signal is inputted, and the subsequent output signal is outputted after the specified numbers of valid signals are inputted.

Subsequently, a detail configuration of the reconfigurable circuit according to the present embodiment will be described. The reconfigurable circuit according to the present embodiment includes the plurality of arithmetic units 10 and the configuration memory 20.

As shown in FIG. 1, the arithmetic unit 10 includes a data processing unit 11, an input valid signal control unit 12, an output data maintenance unit 13 and an output valid signal control unit 14. Note that an example, in which two input data DIA and DIB are inputted into the arithmetic unit 10, is presented as one example in FIG. 1, whereas the embodiment is not limited thereto and the number of the inputted data is determined in accordance with the data path set by the configuration data.

Into the data processing unit 11, the first input data DIA and the second input data DIB are inputted from the other arithmetic unit 10 or from outside and so forth, and an internal valid signal S2 generated by the input valid signal control unit 12 is inputted. Further, the data processing unit 11 is supplied with configuration data (for data processing unit) 21 by the configuration memory 20.

The data processing unit 11 reconfigures the circuitry in accordance with the configuration data supplied to realize the function specified by the configuration data. The data processing unit 11 performs a processing (computation and the like) in accordance with the specified function using the valid input data DIA, DIB to output the processing result to the output data maintenance unit 13 as an internal data INTD. Note that determination to determine whether or not the input data DIA, DIB are valid (determination related to the validity of the input data) made in the data processing unit 11 is based on the value of the internal valid signal S2 from the input valid signal control unit 12.

Into the input valid signal control unit 12, a first valid signal VIA and a second valid signal VIB are inputted from the other arithmetic unit 10, outside or so forth. The valid signals VIA, VIB are signals (tags) indicating whether the corresponding input data DIA, DIB are valid or invalid. Further, configuration data (for input valid signal control unit) 22 is supplied to the input valid signal control unit 12 from the configuration memory 20, and the input valid signal control unit 12 reconfigures the circuitry in accordance with the configuration data.

The input valid signal control unit 12 generates the internal valid signal S2 based on the inputted valid signals VIA, VIB to output the internal valid signal S2 to the data processing unit 11, the output data maintenance unit 13 and the output valid signal control unit 14. In the present embodiment, it is defined that when the value of the internal valid signal S2 is "1" (high level), the data is indicated to be valid, and when the value of the internal valid signal S2 is "0" (zero) (low level), the data is indicated to be invalid. Note that the same definition is also applied to the valid signals VIA, VIB and an output valid signal S3.

Into the output data maintenance unit 13, the internal data INTD outputted from the data processing unit 11 is inputted and the internal valid signal S2 generated by the input valid signal control unit 12 is inputted. The output data maintenance unit 13 is to maintain a valid processing result. The output data maintenance unit 13 continuously maintains data (of the precious clock) already it holds until the internal data INTD is supplied as a valid processing result. When the internal data INTD as a valid processing result is inputted, the output data maintenance unit 13 updates its data from the data already it held to the internal data INTD. The data maintained by the output data maintenance unit 13 is outputted to outside the arithmetic unit 10 as an output data DO. Note that whether or not the internal data INTD is the valid processing result is determined based on the value of the internal valid signal S2.

The output data maintenance unit 13 is composed of a two-input selector 41 and a flip-flop 42 temporarily storing an inputted data to output it, for example as shown in FIG. 4. The two-input selector 41 is supplied with an output from the flip-flop 42 on one input side and the internal data INTD from the data processing unit 11 on the other input side. An input for control of the two-input selector 41 is supplied with the internal valid signal S2 from the input valid signal control unit 12. The two-input selector 41 selects and outputs the internal data INTD when the value of the internal valid signal S2 is "1", and selects and outputs the output from the flip-flop 42 when the value of the internal valid signal S2 is "0 (zero)".

The output of the two-input selector 41 is inputted into the flip-flop 42. The flip-flop 42 supplies its output to one input of the two-input selector 41 and outputs it as an output data OUT by being activated by a not-shown clock signal.

Into the output valid signal control unit 14, the internal valid signal S2 generated by the input valid signal control unit 12 is inputted. The output valid signal control unit 14 generates the output valid signal S3 indicating whether or not the output data DO is valid based on the internal valid signal S2 and the like and outputs the output valid signal S3 outside the arithmetic unit 10. Further, configuration data (for output valid signal control unit) 23 is supplied to the output valid signal control unit 14 from the configuration memory 20, and the output valid signal control unit 14 reconfigures the circuitry in accordance with the configuration data.

Here, the configuration data supplied to the output valid signal control unit 14 includes the configuration data to specify the output timing of the data in the arithmetic unit 10. The configuration data includes, for example, the number of repetition times, an offset value, an interval value, a value of operation mode, a value of activation mode and a value of output timing. The output valid signal S3 is generated and outputted at a timing specified by these data.

The number of repetition times is to specify the number of signal(s) outputted in the modes A, B, C. The offset value specifies the time until the first signal is outputted in the modes A, B. Also, the offset value is used as a specified value of the number of inputted signals in the modes D, E. The interval value specifies the time interval between signals outputted in the modes A, B, C.

The value of operation mode, the value of activation mode and the value of output timing are to specify the mode to be executed. As shown for example in FIGS. 2A to 2C and FIGS. 3A and 3B, the mode to be executed is uniquely determined by the combination of the value of operation mode, the value of activation mode and the value of output timing. In the present embodiment, the value of operation mode and the value of output timing are 1 bit, respectively, and the value of activation mode is 2 bits.

The configuration data 21, 22, 23 are stored in the configuration memory 20 to be supplied to the data processing unit 11, the input valid signal control unit 12 and the output valid signal control unit 14, respectively. The data supplied to the data processing unit 11, the input valid signal control unit 12 and the output valid signal control unit 14, respectively, are switched in response to a configuration switching signal S1 supplied to the configuration memory 20 from a not-shown controlling mechanism. In FIG. 1, the configuration data 21, 22, 23 stored in the configuration memory 20 are shown separately for the purpose of clearly showing their correspondence, however, the configuration data may be stored in the configuration memory 20 in any manner.

Figure 5:
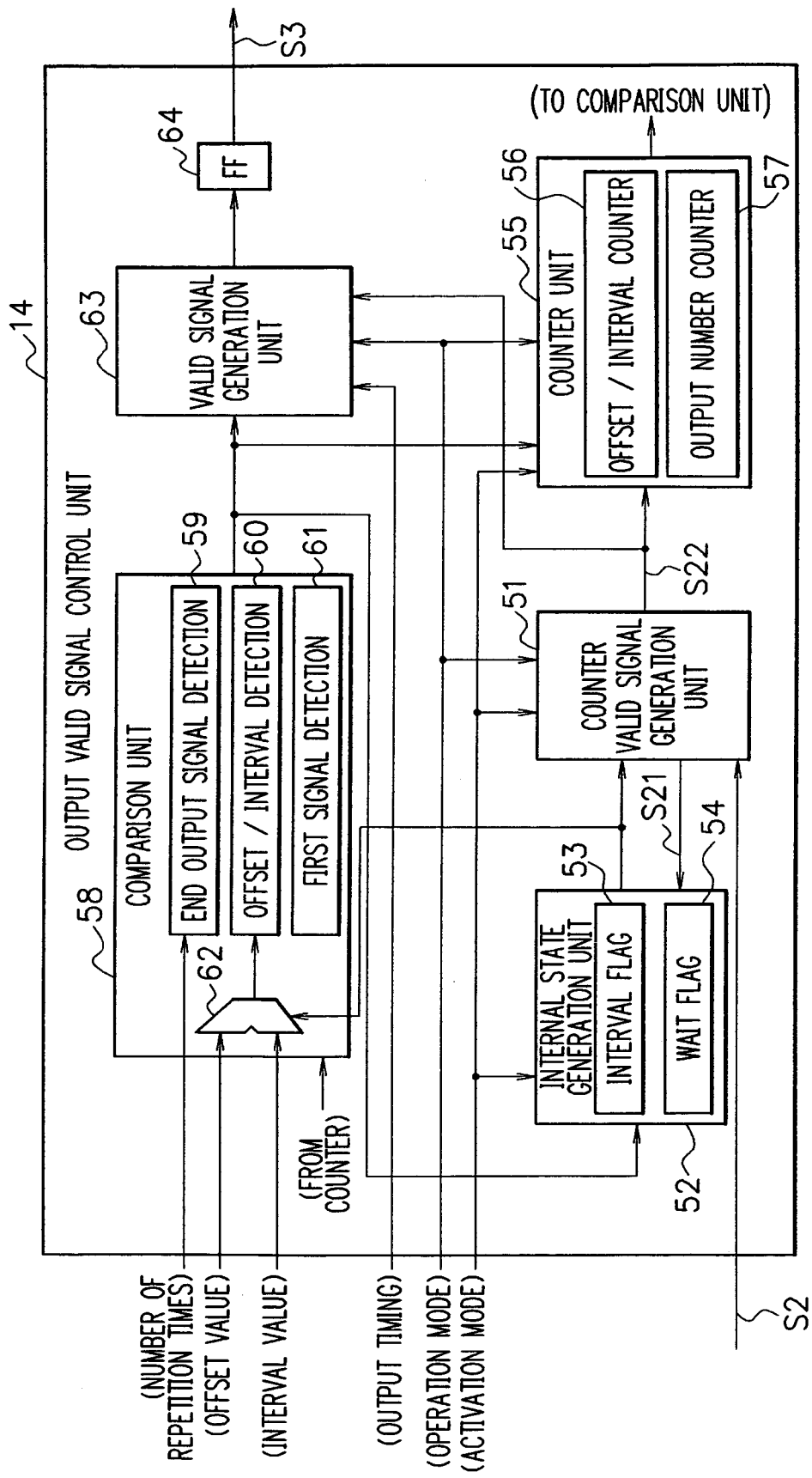
FIG. 5 is a view showing a configuration example of an output valid signal control unit.
Figure 8A:
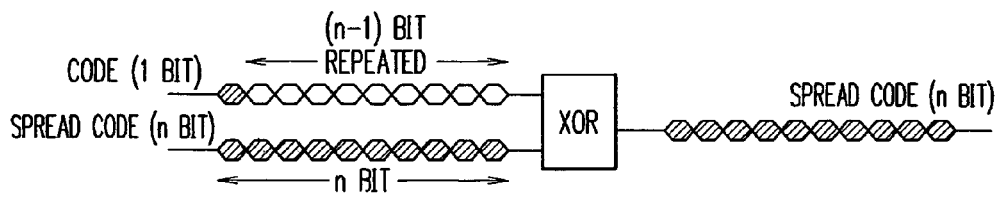
FIG. 8A and FIG. 8B are views to illustrate a processing of spreading code using an n-bits spread code.
Figure 8B:
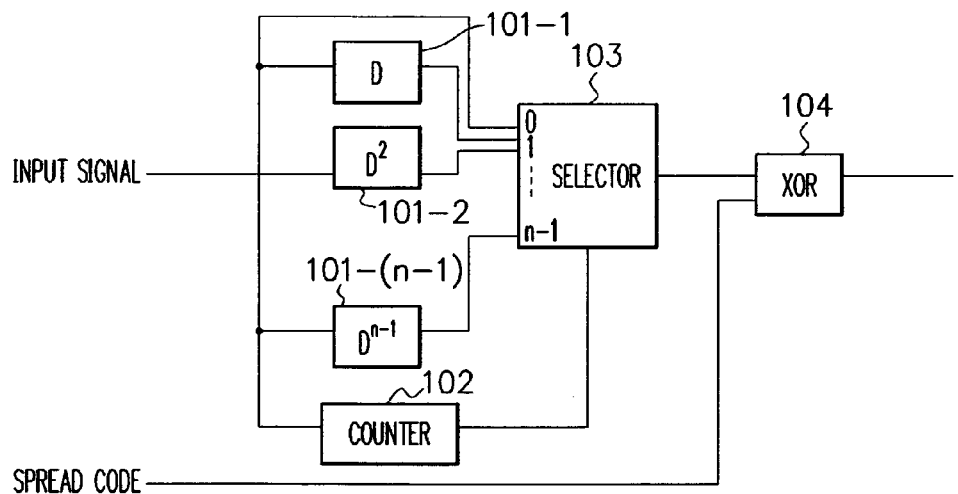
Figure 9A:
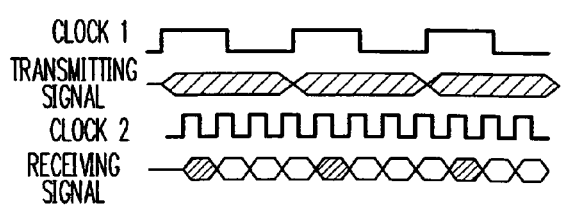
FIG. 9A and FIG. 9B are views to illustrate a data transfer processing between circuits operating at different frequencies.
Figure 9B:
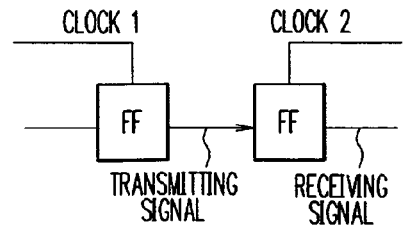

The output valid signal control unit 14 is configured, for example, as shown in FIG. 5. The output valid signal control unit 14 includes a counter valid signal generation unit 51, an internal state generation unit 52, a counter unit 55, a comparison unit 58, a valid signal generation unit 63 and a flip-flop 64. Also, the number of repetition times, the offset value, the interval value, the value of operation mode, the value of activation mode and the value of output timing are supplied as configuration data appropriately from the configuration memory 20 to the output valid signal control unit 14 to be maintained therein.

The counter valid signal generation unit 51 is supplied with the value of operation mode, the value of activation mode, the internal valid signal S2 and the value of a wait flag 54 to generate an internal control signal S21 to control the internal state generation unit 52 and a counter control signal S22 controlling the counter unit 55 based on the values. A generation logic table for the internal control signal S21 and the counter control signal S22 in the counter valid signal generation unit 51 will be shown in Table 1.

TABLE 1

Logic Table for Counter Valid Signal Generation Unit

| OPERATION MODE | ACTIVATION MODE | INTERNAL VALID SIGNAL | WAIT FLAG | INTERNAL CONTROL SIGNAL | COUNTER CONTROL SIGNAL |
|---|---|---|---|---|---|
| 0 | XX | 1 | X | 0 | 1 |
| 1 | 0X | 1 | 0 | 1 | 1 |
|   | 0X | X | 1 | 1 | 1 |
|   | 1X | X | X | 1 | 1 |
| Others |  |  |  | 0 | 0 |

As shown in Table 1, when the value of operation mode is "0 (zero)", namely when the operation mode is the mode D or E, and the value of the internal valid signal S2 is "1", the counter valid signal generation unit 51 sets the value of the internal control signal S21 to "0 (zero)" and the value of the counter control signal S22 to "1". Further, when the value of operation mode is "1" and the value of activation mode is "0 (zero) X" (X is any value, the same applies also hereinbelow), namely when the operation mode is the mode B or C, the value of the internal valid signal S2 is "1" and the value of the wait flag 54 is "0 (zero)", the counter valid signal generation unit 51 sets both the values of the internal control signal S21 and the counter control signal S22 to "1".

Further, when the value of operation mode is "1" and the value of activation mode is "0 (zero) X", namely when the operation mode is the mode B or C, and the value of the wait flag 54 is "1", the counter valid signal generation unit 51 sets both the values of the internal control signal S21 and the counter control signal S22 to "1". Further, when the value of operation mode is "1" and the value of activation mode is "1X", namely when the operation mode is the mode A, the counter valid signal generation unit 51 sets both the values of the internal control signal S21 and the counter control signal S22 to "1". In the other case, the counter valid signal generation unit 51 sets both the values of the control signals S21 and S22 to "0 (zero)".

The internal state generation unit 52 is supplied with the internal control signal S21, the value of activation mode, a result output of the comparison unit 58 to generate an interval flag 53 and the wait flag 54 indicating a state in each operation mode based on the values. Here, the interval flag 53 is a flag switching the value (comparison value) compared to the value of an offset/interval counter 56, and, in the modes A, B, to make the offset value be selected as a comparison value during the period of the offset, and the interval value be selected as a comparison value during the interval period from a signal output to a signal output. The wait flag 54 is a flag to place the counter unit 55 into a stop state until the first input signal is inputted in the modes B, C.

Generation logic tables for the interval flag 53 and the wait flag 54 in the internal state generation unit 52 will be shown in Table 2 and Table 3, respectively.

TABLE 2

Logic Table for Interval Flag

| INTERNAL CONTROL SIGNAL | RESULT OUTPUT OF COMPARISON UNIT | | INTERVAL FLAG |
|---|---|---|---|
|  | OFFSET/ INTERVAL DETECTION VALUE | END OUTPUT SIGNAL DETECTION VALUE |  |
| 1 | 1 | 0 | 1 |
| 1 | 1 | 1 | 0 |
| Others |  |  | — |

As shown in Table 2, when the value of the internal control signal S21 is "1" and out of the result outputs of the comparison unit 58, the offset/interval detection value is "1" and the end output signal detection value is "0 (zero)", the internal state generation unit 52 sets the interval flag 53 to "1". Further, when the value of the internal control signal S21 is "1" and out of the result outputs of the comparison unit 58, both the offset/interval detection value and the end output signal detection value are "1", the internal state generation unit 52 sets the interval flag 53 to "0 (zero)". In the other case, the value of the interval flag 53 is still maintained.

TABLE 3

Logic Table for Wait Flag

| INTERNAL CONTROL SIGNAL | ACTIVATION MODE | RESULT OUTPUT OF COMPARISON UNIT | | WAIT FLAG |
|---|---|---|---|---|
|  |  | OFFSET/INTERVAL DETECTION VALUE | END OUTPUT SIGNAL DETECTION VALUE |  |
| 1 | 00 | 0 | X | 1 |
|  |  | 1 | 0 | 1 |
|  | 01 | 1 | 0 | 1 |
|  | 0X | 1 | 1 | 0 |
|  | 1X | X | X | — |
| Others |  |  |  | — |

As shown in Table 3, when the value of the internal control signal S21 is "1" and the value of activation mode is "00 (zero zero)", and out of the result outputs of the comparison unit 58, the offset/interval detection value is "0 (zero)", the internal state generation unit 52 sets the wait flag 54 to "1". Further, when the value of the internal control signal S21 is "1" and the value of activation mode is "0 (zero) X", and out of the result outputs of the comparison unit 58, the offset/interval detection value is "1" and the end output signal detection value is "0 (zero)", the internal state generation unit 52 sets the wait flag 54 to "1".

Further, when the value of the internal control signal S21 is "1" and the value of activation mode is "0 (zero) X", and out of the result outputs of the comparison unit 58, both the offset/interval detection value and the end output signal detection value are "1", the internal state generation unit 52 sets the wait flag 54 to "0 (zero)". In the other case, the value of the wait flag 54 is still maintained.

The counter unit 55 includes the offset/interval counter 56 counting the number of cycles (clocks) or input signals (input data) and an output number counter 57 counting the number of output signals (output data). Note that the offset/interval counter 56 is designed to be switched when used in the present embodiment in that the offset time and the interval time are in no case counted together, however, it is also possible to provide a counter for counting the offset time and a counter for counting the interval time separately. A logic table related to the operations of the respective counters in the counter unit 55 will be shown in Table 4.

57 is reset to "0 (zero)". In the other case, the counted value of the offset/interval counter 57 is still maintained.

The comparison unit 58 compares the counted value of the offset/interval counter 56 and the offset value or the interval value (selected by the interval flag 53) supplied by the configuration memory 20, and compares the counted value of the output number counter 57 and the number of repetition times supplied by the configuration memory 20 to determine the output timing of the output data (output valid signal). Also, the comparison unit 58 detects the input of the first input signal to perform a comparison to output the first signal detection value.

The description will be given of the functions realized by the comparison unit 58 with reference to FIG. 6.

An end output signal detection unit 59 in the comparison unit 58 compares the counted value of the output number counter 57 and the number of repetition times, and when the values match, the end output signal detection unit 59 sets the end output signal detection value as a result output to "1", and when not, the end output signal detection unit 59 sets the end output signal detection value to "0 (zero)".

Further, a first signal detection unit 61 in the comparison unit 58 monitors the counted value of the offset/interval counter 56, and when the counted value is "0 (zero)", the first signal detection unit 61 sets the first signal detection value as a result output to "1", and when not, the first signal detection unit 61 sets the first signal detection value to "0 (zero)".

Further, an offset/interval detection unit 60 in the comparison unit 58 compares an output of a selector 62 and the

TABLE 4

Logic Table for Counter Unit

| COUNTER CONTROL SIGNAL | RESULT OUTPUT OF COMPARISON UNIT | | OFFSET/ INTERVAL COUNTER | OUTPUT NUMBER COUNTER |
|---|---|---|---|---|
| | OFFSET/INTERVAL DETECTION VALUE | END OUTPUT SIGNAL DETECTION VALUE | | |
| 1 | 0 | X | +1 | — |
| | 1 | 0 | 0 | +1 |
| | | 1 | | 0 |
| Others | | | — | — |

As shown in Table 4, when the value of the counter control signal S22 is "1" and out of the result outputs of the comparison unit 58, the offset/interval detection value is "0 (zero)", the counted value of the offset/interval counter 56 is incrementally increased by 1. Further, when the value of the counter control signal S22 is "1" and the offset/interval detection value is "1", the counted value of the offset/interval counter 56 is reset to "0 (zero)". In the other case, the counted value of the offset/interval counter 56 is still maintained.

When the value of the counter control signal S22 is "1" and out of the result outputs of the comparison unit 58, the offset/interval detection value is "1", the end output signal detection value is "0 (zero)", the counted value of the output number counter 57 is incrementally increased by 1. Further, when the value of the counter control signal S22 is "1" and out of the result outputs of the comparison unit 58, both the offset/interval detection value and the end output signal detection value are "1", the counted value of the output number counter counted value of the offset/interval counter 56. Here, the selector 62 outputs either the offset value or the interval value in accordance with the value of the interval flag 53. As a result of the comparison, the offset/interval detection unit 60 sets the offset/interval detection value as a result output to "1" when the values match, and sets the same to "0 (zero) when the values do not match.

The counter control signal S22, the value of operation mode and the value of output timing and the result output of the comparison unit 58 are inputted into a valid signal generation unit 63. The valid signal generation unit 63 generates and outputs an output valid signal indicating the validity of the output signal based thereon. Note that, since a flip-flop 64 maintaining the output valid signal generated and outputted is provided at the subsequent stage of the valid signal generation unit 63, the output is performed to outside the arithmetic unit 10 with one cycle delay after the output valid signal is generated by the valid signal generation unit 63. A generation logic table for the output valid signal in the valid signal generation unit 63 will be shown in Table 5.

TABLE 5

Logic Table for Valid Signal Generation Unit

| COUNTER | | | RESULT OUTPUT OF COMPARISON UNIT | | OUTPUT |
| --- | --- | --- | --- | --- | --- |
| CONTROL SIGNAL | OPERATION MODE | OUTPUT TIMING | FIRST SIGNAL DETECTION VALUE | OFFSET/INTERVAL DETECTION VALUE | VALID SIGNAL |
| 0 | X | X | X | X | 0 |
| 1 | 0 | 0 | 1 | X | 1 |
|  |  | 1 | X | 1 | 1 |
|  | 1 | X | X | 1 | 1 |
| Others |  |  |  |  | 0 |

As shown in Table 5, when the value of the counter control signal S22 is "1", both the values of operation mode and output timing are "0 (zero)" and the first signal detection value out of the result outputs of the comparison unit 58 is "1", the valid signal generation unit 63 sets the value of the output valid signal to "1". When the value of the counter control signal S22 is "1", the value of operation mode is "0 (zero)", the value of output timing is "1" and the offset/interval detection value out of the result outputs of the comparison unit 58 is "1", the valid signal generation unit 63 sets the value of the output valid signal to "1". Further, when both the values of the counter control signal S22 and operation mode are "1", and the offset/interval detection value out of the result outputs of the comparison unit 58 is "1", the valid signal generation unit 63 sets the value of the output valid signal to "1". In the other case, the value of the output valid signal is set to "0 (zero)".

<Mode A>

The description will be given of the operation in the mode A shown in FIG. 2A. In the mode A, the first valid output data is outputted after the predetermined time has passed after the configuration is switched (more specifically, when the arithmetic unit 10 starts an operation in accordance with the configuration data after a switching after the predetermined time has passed), and the designated number of valid output data are outputted at certain intervals thereafter. In the operation in the mode A described below, the output data is assumed to be set in the output data maintenance unit 13.

In an initial state after the configuration is switched based on the configuration switching signal S1 inputted, the offset/interval detection value, the end output signal detection value and the value of the interval flag 53 are initialized to "0 (zero)". In addition, in the mode A, the value of operation mode is "1" and the value of activation mode is "1X" ("11" or "10").

In this case, in compliance with the logic table shown in Table 1, the counter valid signal generation unit 51 outputs the internal control signal S21 and the counter control signal S22 both having "1" as a value. In addition, the value of the flag in the internal state generation unit 52 is maintained. In the counter unit 55, the counted value of the offset/interval counter 56 increases by 1 to "1".

Meanwhile, since the value of the interval flag 53 is "0 (zero)", the offset/interval detection unit 60 in the comparison unit 58 compares the offset value and the counted value of the offset/interval counter 56. When the offset value is set to "0 (zero)", the counted value of the offset/interval counter 56 is "0 (zero)", in which the offset/interval detection value is set to "1" and the output valid signal indicating "1" is outputted, however, in this case, the offset value is defined to be k ($\neq 0$ (zero)) (in the example shown in FIG. 2A, k=2). Therefore, the offset/interval detection value is "0 (zero)", and the output valid signal indicating "0 (zero)" is generated and outputted by the valid signal generation unit 63.

At the subsequent cycle, the offset/interval detection unit 60 in the comparison unit 58 compares the counted value of the offset/interval counter 56 and the offset value. As a result, when the counted value of the counter 56 and the offset value are different, the offset/interval detection value is set to "0 (zero). In the counter unit 55, the counted value of the offset/interval counter 56 is increased by 1 to "2".

This processing is repeated continuously to the extent that the counted value of the offset/interval counter 56 and the offset value become equal. When the offset value is "k", the counted value of the counter 56 and the offset value become equal at the k-th cycle. When the counted value of the offset/interval counter 56 and the offset value become equal, the offset/interval detection unit 60 sets the offset/interval detection value to "1".

As a result, the offset/interval counter 56 resets the counted value to "0 (zero)" and the output number counter 57 sets the counted value to "1". Further, the interval flag 53 of the internal state generation unit 52 is set to "1", and the selector 62 selects the interval value instead of the offset value as a comparison value used in the offset/interval detection unit 60 in the comparison unit 58. Further, the valid signal generation unit 63 outputs "1" (output 1) as an output valid signal S3. Accordingly, the output data at this time is outputted as a valid data.

At the subsequent time and thereafter, in which the offset/interval detection value is set to "1", the offset/interval detection unit 60 in the comparison unit 58 compares the counted value of the offset/interval counter 56 and the interval value to set the offset/interval detection value. As a result of the comparison between the counted value of the offset/interval counter 56 and the interval value, when the values are different, the offset/interval detection value is set to "0 (zero)" and the offset/interval counter 56 increases the counted value by 1. As time goes on, the counted value of the offset/interval counter 56 is incrementally increased by 1 for every cycle until the counted value becomes equal to the interval value.

When the counted value of the offset/interval counter 56 equals the interval value (for example, in the example shown in FIG. 2A, a time after 1 cycle passed as an interval time), the offset/interval detection unit 60 in the comparison unit 58 sets the offset/interval detection value to "1". As a result, the offset/interval counter 56 resets the counted value to "0 (zero)" and the output number counter 57 sets the counted value to "2". Further, the valid signal generation unit 63 outputs "1" (output 2) as an output valid signal S3.

Hereinafter, in the same manner as above, the output valid signal S3 is set to "1" at a time interval set as the interval value. When the counted value of the output number counter 57 reaches to the number of repetition times, the end output signal detection unit 59 in the comparison unit 58 sets the output signal detection value to "1". Backed by this, the interval flag 53 in the internal state generation unit 52 is reset to "0 (zero)".

From the subsequent time, in the offset/interval detection unit 60 in the comparison unit 58, the comparison is made again between the counted value of the offset/interval counter 56 and the interval value and the operation of the above-described processing are repeated.

<Mode B>

Subsequently, the description will be given of the operation in the mode B shown in FIG. 2B. In the mode B, after a valid input data is inputted into the arithmetic unit 10, a first valid output data is outputted after a predetermined time is passed, and after that, the designated number of valid output data is outputted at certain time intervals. The wait flag 54 is used in the operation in the mode B described below.

In the initial state after the configuration is switched based on the configuration switching signal S1 inputted, the offset/interval detection value, the end output signal detection value, the value of the interval flag 53 and the value of the wait flag 54 are initialized to "0 (zero)". Further, in the mode B, the value of operation mode is "1" and the value of activation mode is "00 (zero zero)". Therefore, the counter valid signal generation unit 51 outputs the internal control signal S21 and the counter control signal S22 both indicating "0 (zero)" until the valid input data is inputted (in other words, until the value of the internal valid signal S2 indicating the validity of the input data becomes "1"). Accordingly, both the counted values of the two counters 56, 57 in the counter unit 55 still remain to be "0 (zero)", and the value of the output valid signal generated by the valid signal generation unit 63 is "0 (zero)".

After that, when the valid input data is inputted into the arithmetic unit 10, the value of the internal valid signal S2 becomes "1". Therefore, the counter valid signal generation unit 51 outputs the internal control signal S21 and the counter control signal S22 both indicating "1" as a value.

Meanwhile, since the value of the interval flag 53 is "0 (zero)", the offset/interval detection unit 60 in the comparison unit 58 compares the offset value and the counted value of the offset/interval counter 56 to determine the offset/interval detection value based on the result.

When the offset value is "0 (zero)", since the counted value of the offset/interval counter 56 is "0 (zero)", the offset/interval detection value becomes "1" and the output valid signal indicating "1" as a value is outputted from the valid signal generation unit 63. Meanwhile, when the offset value is not "0 (zero)", the offset/interval detection value remains to be "0 (zero)", and the counted value of the offset/interval counter 56 in the counter unit 55 becomes "1" and the output valid signal indicating "0 (zero)" as a value is outputted.

Hereinafter, in the same manner as in the operation of the previously-described processing in the mode A, the offset/interval counter 56 continuously counts until the counted value (number of cycles) becomes equal to the offset value. When the counted value of the counter 56 and the offset value become equal, the offset/interval detection unit 60 in the comparison unit 58 sets the offset/interval detection value to "1". Backed by this, the valid signal generation unit 63 outputs "1" (output 1) as an output valid signal S3. After that, the offset/interval detection value is reset to "0 (zero)".

Subsequently, the comparison value compared with the counted value of the offset/interval counter 56 is changed to the interval value, and the count is continuously performed again until the counted value of the offset/interval counter 56 reaches to the interval value. When the counted value of the counter 56 and the interval value become equal, the offset/interval detection unit 60 in the comparison unit 58 sets the offset/interval detection value to "1" again. Backed by this, the valid signal generation unit 63 outputs "1" (output 2) as an output valid signal S3.

By way of counting the value of the output valid signal S3 as "1", the number of times is counted by the output number counter 57 and the above-described processing is repeated until the counted value of the output number counter 57 reaches to the number of repetition times. When the counted value of the output number counter 57 reaches to the number of repetition times, the end output signal detection unit 59 in the comparison unit 58 sets the end output signal detection value to "1". With this, in the internal state generation unit 52, both the interval flag 53 and the wait flag 54 are set to "0 (zero)" and reset to the initial state.

<Mode C>

Subsequently, the description will be given of the operation in the mode C shown in FIG. 2C. In the mode C, after the specified numbers of valid input data are inputted into the arithmetic unit 10, the first valid output data is outputted, and the designated number of valid output data are outputted at certain time intervals thereafter.

In the operation of the above-described mode B, the offset/interval counter 56 counts the number of cycles after the valid input data is inputted, and the first valid output data is outputted after the counted value has reached to the offset value. In the operation of the mode C, the offset/interval counter 56 counts the number of valid input data (in other words, the number of times when the value of the internal valid signal S2 indicating the validity of the input data is "1") instead of counting the number of cycles, and the first valid output data is outputted after the counted value has reached to the offset value.

Therefore, in the operation of the mode C, the value of the wait flag 54 remains to be "0 (zero)" until the first valid output data is outputted, and the counter control signal S22 indicating "1" as a value is outputted by the counter valid signal generation unit 51 only when the internal valid signal S2 is inputted and then the counted value of the offset/interval counter 56 is incrementally increased. When the counted value of the offset/interval counter 56 reaches to the offset value, the offset/interval detection unit 60 in the comparison unit 58 sets the offset/interval detection value to "1". Backed by this, the valid signal generation unit 63 outputs "1" as an output valid signal S3, so that the first valid output data is outputted. The operation followed is the same as in the above-described mode B, the description thereof is therefore omitted.

<Mode D>

Subsequently, the description will be given of the operation in the mode D shown in FIG. 3A. In the mode D, after the specified numbers of valid input data are inputted into the arithmetic unit 10, the valid output data is outputted only once.

In the mode D, as is apparent from Table 1, the value of the internal control signal S21 outputted from the counter valid signal generation unit 51 is always "0 (zero)" and both the interval flag 53 and wait flag 54 remain to be fixed to "0 (zero)". Further, the number of input data that is not outputted (for example, as shown in FIG. 3A, when it is desired that the valid output data is outputted after two data inputs, the offset value is 1) is set as the offset value of the configuration data.

After the operation is started by switching the configuration based on the inputted configuration switching signal S1, the counter valid signal generation unit 51 sets the value of the counter control signal S22 to "1" when the internal valid signal S2 is inputted. Backed by this, the counted value of the offset/interval counter 56 is incrementally increased.

When the number of input data designated by the offset value is inputted, the counted value of the offset/interval counter 56 becomes equal to the offset value at the next cycle, so that the offset/interval detection unit 60 in the comparison unit 58 sets the offset/interval detection value to "1". Thereafter, the value of the counter control signal S22 outputted from the counter valid signal generation unit 51 remains to be "0 (zero)" until the internal valid signal S2 is inputted, therefore, the counted value of the offset/interval counter 56 remains to be fixed to the offset value.

After that, when a next valid input data (namely the internal valid signal S2 indicating "1" as a value") is inputted, the value of the counter control signal S22 becomes "1" and the valid signal generation unit 63 outputs the output valid signal indicating "1" as a value. In the counter unit 55, the counted value of the offset/interval counter 56 is reset to "0 (zero)" and the valid input data is started to be counted again at and after the next cycle, and the above-described operation is repeated.

<Mode E>

Subsequently, the description will be given of the operation in the mode E shown in FIG. 3B. In the mode E, the valid output data is outputted only when the first valid input data out of the specified numbers of valid input data is inputted into the arithmetic unit 10.

The operation in the mode E is substantially the same as of the mode D, however, the output timing of the output valid signal indicating "1" as a value in the valid signal generation unit 63 is different. In the mode D, the output valid signal is set to "1" at the timing when such the number of input data that is the offset value plus 1 is (are) inputted, while in the mode E, the output valid signal is set to "1" at the timing when the first valid input data is inputted. Therefore, in the operation of the mode E, the valid signal generation unit 63 determines the value of the output valid signal by referring to the first signal detection value set by the first signal detection unit 61 in the comparison unit 58.

As has been described, according to the present embodiment, the arithmetic unit 10, of which circuitry can be dynamically reconfigured in accordance with the configuration data from the configuration memory 20, includes the data processing unit 11 performing the processing using the input data, and on top of that, the output data maintenance unit 13 maintaining the processing result to output it outside the arithmetic unit 10 as the output data DO and the output valid signal control unit 14 outputting the output valid signal S3 indicating whether or not the output data DO is valid.

With this, by controlling the output timing of the output valid signal S3 from the output valid signal control unit 14, more specifically the timing of setting the signal to "1", the output timing of the valid output data DO to outside the arithmetic unit 10 can be controlled optionally. Accordingly, it is possible to provide the reconfigurable circuit capable of controlling the output timing of the data to outside the arithmetic unit 10, in which, for example, when trying to perform a processing, the processing can be realized with a smaller number of arithmetic units 10 as compared to the conventional art.

Note that, as described above, the reconfigurable circuit according to the present embodiment is composed of a plurality of arithmetic units, in which, however, the every arithmetic unit may be composed of the output data maintenance unit 13 and the output valid signal control unit 14 as in the arithmetic unit 10 and, in the same manner, a part thereof may be composed of the output data maintenance unit 13 and the output valid signal control unit 14 while the remaining arithmetic unit(s) is (are) composed only of the data processing unit 11 and the input valid signal control unit 12.

FIG. 7 is a block diagram showing a configuration example of a radio communication system using the reconfigurable circuit according to the present embodiment.

As shown in FIG. 7, the radio communication system includes an antenna unit 71, a RF unit 72, a digital baseband processing unit 73, a reconfigurable circuit unit 74 and a MAC unit 75. The antenna unit 71 is to receive/send a radio signal (RF signal). The RF unit 72 performs a RF/IF conversion processing. The RF unit 72 converts the RF (high frequency) signal received by the antenna unit 71 into an IF (intermediate frequency) signal to supply it to the digital baseband processing unit 73 and the reconfigurable circuit unit 74, or converts the IF signal from the digital baseband processing unit 73 and the reconfigurable circuit unit 74 into the RF signal to supply it to the antenna unit 71.

The digital baseband processing unit 73 and the reconfigurable circuit unit 74 are to perform a baseband processing related to the signal to receive/send, and for example, performs the processing related to the previously-described stream data. The reconfigurable circuit unit 74 is configured using the reconfigurable circuit according to the present embodiment and executes a part of the baseband processing to be executed. Note that every baseband processing to be executed may be executed by the reconfigurable circuit unit 74 without providing the digital baseband processing unit 73. The MAC unit 75 is to perform a so-called MAC processing.

Note that the radio communication system shown in FIG. 7 shows a usage example of the reconfigurable circuit according to the present embodiment, and the usage of the reconfigurable circuit according to the present embodiment is not limited thereto.

According to the present invention, the arithmetic unit being a component of the semiconductor device and capable of dynamically reconfiguring its circuitry in accordance with the configuration information supplied includes the output data maintenance unit maintaining the processing result obtained based on the input data to output as an output data and the output valid signal control unit outputting the output valid signal indicating whether or not the output data is valid. Based on this, by controlling the output timing of the output valid signal outputted from the output valid signal control unit, it is possible to control the output timing of the data to outside the arithmetic unit. Hence, it is possible to provide the reconfigurable semiconductor device including the arithmetic unit capable of controlling the output timing of the data, so that a desired processing can be realized with the smaller number of arithmetic units than that of the conventional arts.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A semiconductor device comprising:
    a configuration memory storing configuration information; and
    a plurality of arithmetic units capable of reconfiguring circuitry dynamically in accordance with the configuration information supplied by said configuration memory,
    wherein at least one of the plurality of arithmetic unit includes:

a data processing unit performing a processing in accordance with the configuration information using input data;

an output data maintenance unit maintaining a processing result of the data processing unit and outputting the processing result maintained as output data; and an output valid signal control unit outputting an output valid signal indicating whether or not the output data outputted by the output data maintenance unit is valid, wherein the output valid signal control unit includes:

a counter unit counting a number of cycles or a number of data;

a comparison unit comparing a counted value of the counter unit and a value related to an output timing of the output valid signal specified by the configuration information; and an output valid signal generation unit generating and outputting the output valid signal based on a comparison result of the comparison unit, wherein an output timing of valid output data and a number of valid output data are specified by the configuration information, and wherein the counter unit is switched by the configuration information between performing a first operation counting a number of cycles, a second operation counting a number of valid input data, and a third operation counting a number of valid input data and counting a number of cycles after a specified number of valid input data being specified by the configuration information is inputted.

2. The semiconductor device according to claim 1, wherein the output valid signal control unit outputs the output valid signal at a timing specified by the configuration information.

3. The semiconductor device according to claim 1, wherein the data processing unit performs the processing based on an internal valid signal generated based on a signal indicating whether or not the input data is valid, and wherein the output data maintenance unit acquires the processing result of the data processing unit when the input data is indicated to be valid by the internal valid signal and maintains the acquired processing result.

4. The semiconductor device according to claim 1, wherein the output data maintenance unit comprises:

a data maintenance unit temporarily maintaining previously inputted data to the data maintenace unit and outputting the previously inputted data to the data maintenance unit as the output data; and a selector unit receiving the processing result of the data processing unit and the output of the data maintenance unit to supply the processing result of the data processing unit or the output of the data maintenance unit to an input of the data maintenance unit.

5. The semiconductor device according to claim 1, wherein the counter unit is capable of counting a number of valid input data, a number of cycles from when an output is generated to when the valid output data is outputted, a number of cycles related to a time interval of outputting the valid output data, and a number of the valid output data.

6. The semiconductor device according to claim 1, wherein the output data maintenance unit and the output valid signal control unit output the output data and the output valid signal so that a first valid output data is outputted after a predetermined time has passed since an operation in accordance with the configuration information is started, and, subsequently, a specified number of valid output data being specified by the configuration information is outputted at certain time intervals.

7. The semiconductor device according to claim 1, wherein the output data maintenance unit and the output valid signal control unit output the output data and the output valid signal so that a first valid output data is outputted after a predetermined time has passed since a valid input data is inputted, and, subsequently, a specified number of valid output data being specified by the configuration information is outputted at certain time intervals.

8. The semiconductor device according to claim 1, wherein the output data maintenance unit and the output valid signal control unit output the output data and the output valid signal so that a first valid output data is outputted after a specified number of valid data being specified by the configuration information is inputted, and, subsequently, a specified number of output data being specified by the configuration information is outputted at certain time intervals.

9. The semiconductor device according to claim 1, wherein the output data maintenance unit and the output valid signal control unit output the output data and the output valid signal that valid output data is outputted only once after a specified number of valid input data being specified by the configuration information is inputted.

10. The semiconductor device according to claim 1, wherein the output data maintenance unit and the output valid signal control unit output the output data and the output valid signal so that valid output data is outputted only when a first valid input data, with respect to a specified number of valid input data being specified by the configuration information, is inputted.

11. The semiconductor device according to claim 1, wherein each one of the plurality of arithmetic units includes the data processing unit, the output data maintenance unit and the output valid control unit.

12. The semiconductor device according to claim 1, wherein a baseband processing function of a radio communication system is performed by the semiconductor device.

13. The semiconductor device according to claim 1, wherein a part of a baseband processing function of a radio communication system is performed by the semiconductor device.

14. The semiconductor device according to claim 1, wherein the counter unit is activated when a configuration is switched or when a first valid input data is inputted after a configuration is switched, and wherein an activation timing of the counter unit is switched in accordance with a value of activation mode being specified by the configuration information.

15. The semiconductor device according to claim 1, wherein the configuration information comprises:

an offset value specifying a number of cycles after the counter unit is activated until the valid output data is outputted, an interval value specifying a number of cycles corresponding to an output interval of the valid output data, and a number of repetition times specifying a number of times the valid output data is outputted, and wherein the output valid signal control unit outputs the output valid signal based on the offset value, the interval value, and the number of repetition times.

16. The semiconductor device according to claim 1,
wherein the counter unit is capable of switching to perform as an offset counter counting a number of cycles after the counter unit is activated or to perform as an interval counter counting a number of cycles related to an output interval of the valid output data in accordance with a flag, and
wherein the counter unit counts the number of cycles after the counter unit is activated when operating as the offset counter, and when a counted value of the counter unit and the offset value specifying a number of cycles after the counter unit is activated until the valid output data is outputted become equal, the counted value of the counter unit is reset and the flag is reversed, and the counter unit counts the number of cycles related to the output interval of the valid output data in operating as the interval counter.

17. The semiconductor device according to claim 1,
wherein the configuration information includes an offset value, and
wherein the offset value specifies a number of cycles after the counter unit is activated until the valid output data is outputted when the counter unit performs the first operation, specifies a number of valid input data not outputted as an output data when the counter unit performs the second operation, and specifies a number of valid input data not outputted as an output data until the valid output data is outputted when the counter unit performs the third operation.

* * * * *